(12) United States Patent
Miao

(10) Patent No.: US 7,280,650 B2
(45) Date of Patent: Oct. 9, 2007

(54) METHOD AND APPARATUS TO MANAGE A CONFERENCE

(75) Inventor: Kai X Miao, Boonton, NJ (US)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 10/233,102

(22) Filed: Aug. 28, 2002

(65) Prior Publication Data

US 2004/0042601 A1    Mar. 4, 2004

(51) Int. Cl.
*H04M 3/42* (2006.01)
*H04M 3/00* (2006.01)

(52) U.S. Cl. .............. 379/202.01; 379/265.09

(58) Field of Classification Search .......... 379/202.01, 379/265.09; 370/260
See application file for complete search history.

(56) References Cited

U.S. PATENT DOCUMENTS

| | | | | |
|---|---|---|---|---|
| 5,539,741 | A * | 7/1996 | Barraclough et al. | 370/267 |
| 5,745,161 | A * | 4/1998 | Ito | 348/14.09 |
| 6,304,648 | B1 * | 10/2001 | Chang | 379/202.01 |
| 6,324,169 | B1 * | 11/2001 | Roy | 370/260 |
| 6,778,493 | B1 * | 8/2004 | Ishii | 370/229 |
| 6,850,496 | B1 * | 2/2005 | Knappe et al. | 370/260 |
| 7,012,630 | B2 * | 3/2006 | Curry et al. | 379/202.01 |

* cited by examiner

*Primary Examiner*—Rasha S. Al-Aubaidi
(74) *Attorney, Agent, or Firm*—Kacvinsky LLC

(57) ABSTRACT

A method and apparatus to manage delay in a multimedia conference session is described.

17 Claims, 3 Drawing Sheets

METHOD AND APPARATUS TO MANAGE A CONFERENCE

BACKGROUND

A multimedia conferencing session may be a multimedia communication session between multiple parties. Each party may communicate with other parties participating in the session, e.g., a conference call. Multimedia conferencing sessions may be particularly advantageous when parties are geographical remote from one another thereby making face-to-face meetings difficult to attend. As the popularity of multimedia conferencing sessions grow, however, unique challenges may be encountered. For example, multimedia conferencing sessions may be sensitive to delay, particularly for voice communications. Some members of a multimedia conferencing session may be connecting to the session via different networks, such as the traditional Public Switched Telephone Network (PSTN), a packet network, a wireless network, and so forth. Each network may introduce varying amounts of delay into the conferencing session, which may cause disruptions in the session. Consequently, there may be a need for improved multimedia conferencing technology to reduce such problems.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to manage multimedia conferencing. In one embodiment of the invention, a conferencing server may receive three or more streams of multimedia information from various networks. The term "stream" as used herein may refer to a set of information sent between two devices. The term "multimedia information" as used herein may refer to any information capable of communication between two devices, including information representing text, graphics, images, video, voice, audio, sounds, music, tones and so forth. The conferencing server may determine a delay parameter for one or more streams. The conferencing server may attempt to synchronize the streams using the delay parameter. More particularly, the conferencing server may introduce a predetermined amount of delay into one or more of the streams to coincide with the delay of the other streams. As a result, a multimedia conferencing session such as an audio conference call may be perceived as a normal conversation among a group of individuals.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
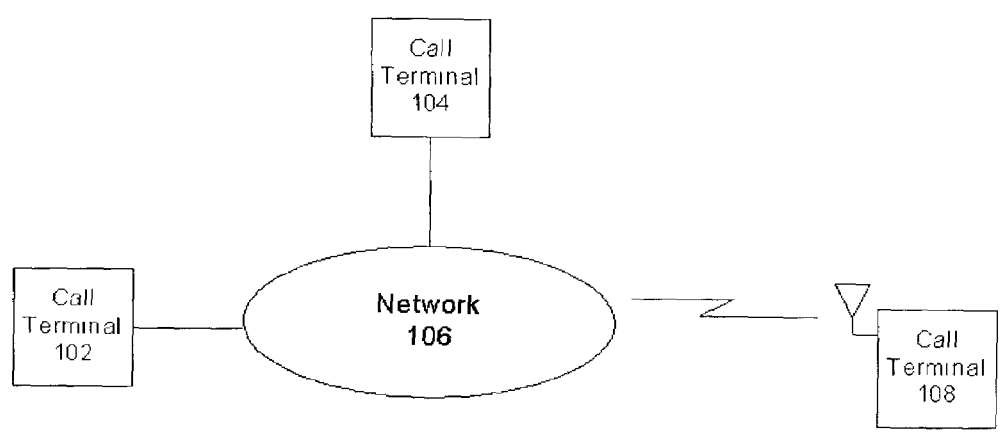
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100. System 100 may comprise, for example, call terminals 102, 104 and 108, all connected by a network 106. Further, the call terminals may communicate information between each other over various types of communications media. Examples of communications media may include any media capable of carrying information signals, such as twisted-pair wire, co-axial cable, fiber optics, radio frequencies, electronic, acoustic or optical signals, and so forth. Examples of a call terminal may include any conventional device capable of communicating multimedia signals over a network, including a telephone, a packet telephony telephone, a computer equipped with a speaker and microphone, a mobile telephone, a personal digital assistant equipped with a transceiver, a lap top computer equipped with a modem or transceiver, and so forth. For example, call terminal 108 may comprise a mobile telephone in communication with network 106 over a wireless communication medium.

Network 106 may comprise, for example, a packet network. In one embodiment of the invention, network 106 may operate in accordance with, for example, one or more Internet protocols such as the Transmission Control Protocol (TCP) as defined by the Internet Engineering Task Force (IETF) standard 7, Request For Comment (RFC) 793, adopted in September, 1981, and the Internet Protocol (IP) as defined by the IETF standard 5, RFC 791, adopted in September, 1981, both available from the IETF website, although the embodiments of the invention are not limited to this context. In one embodiment of the invention, network 106 may also include circuit-switched technologies and appropriate interfaces to packet network technologies. In one embodiment of the invention, network 106 may also include the appropriate interfaces to a wireless network to communicate information with a wireless device, e.g., call terminal 108.

More particularly, network 106 may operate in accordance with one or more protocols to communicate packets representing multimedia information. One type of multimedia may comprise, for example, audio or voice information. Communicating packets representing voice information may be accomplished using a technique collectively referred to herein as "Voice Over Packet" or "VOP." In one embodiment of the invention, for example, network 106 may operate in accordance with the International Telecommunications Union (ITU) Recommendation H.323 titled "Packet-based Multimedia Communication Systems," published in November 2000 and available from the ITU website ("H.323 Specification"). In one embodiment of the invention, for example, network 106 may operate in accordance with "SIP: Session Initiation Protocol" as defined by the IETF Proposed Standard, RFC 2543, published in March 1999, and available from the IETF website ("SIP Specification). In one embodiment of the invention, for example, network 106 may operate in accordance with "Megaco Protocol Version 1.0" as defined by the IETF Proposed Standard, RFC 3015, published in November 2000, and also available from the IETF website ("Megaco Specification"). Although specific examples are discussed herein, it may be appreciated that the embodiments of the invention are not limited in this context.

Figure 2:
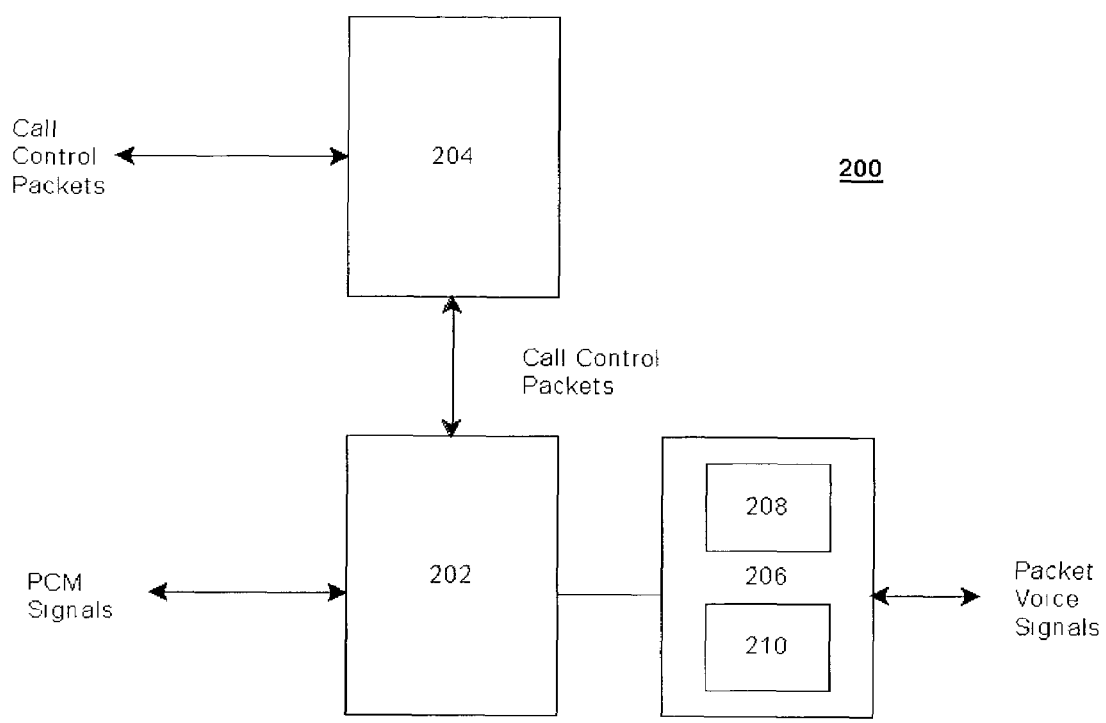
FIG. 2 is a block diagram of a Voice Over Packet (VOP) system in accordance with one embodiment of the invention.

FIG. 2 is a block diagram of a multimedia conferencing system in accordance with one embodiment of the invention. FIG. 2 is a block diagram of a system 200. System 200 may comprise a part of, for example, network 106 shown in FIG. 1. System 200 may comprise VOP elements 202, 204 and 206. Element 206 may further include element 208 and element 210.

Each element may communicate information with other elements in system 200. The information may comprise, for example, multimedia information and control information. The term "control information" may refer to any information related to the management and control of a telephone call, conference session, communication session and so forth. In one embodiment of the invention, multimedia information may be communicated in the form of packets, referred to herein as "media data packets." In one embodiment of the invention, control information may also be communicated in the form of packets, referred to herein as "call control packets."

Element 202 of system 200 may comprise, for example, a media gateway that may operate to convert a conventional telephony call to a packet telephony call or VOP call. In one embodiment, gateway 202 may receive signals from a circuit-switched network and convert them to packet voice signals. An example of a circuit-switched network may be the PSTN. An example of signals communicated via a circuit-switched network may comprise Pulse Code Modulation (PCM) signals. The conversion to packets may be made in accordance with, for example, the TCP/IP Specification, SIP Specification, H.323 Specification, Megaco Specification and others. Gateway 202 may communicate both call control packets and media data packets through other components of system 200 until the packets reach their intended destination, e.g., a call terminal connected to system 200.

Element 204 of system 200 may comprise, for example, a media gateway controller or gatekeeper to perform conventional call processing functions, such as address translation, admission control, call control signaling, call authorization, call management and so forth in accordance with the SIP Specification, Megaco Specification or H.323 Specification, for example. Controller 204 may communicate with gateway 202 via call control packets to perform such call processing functions. In one embodiment of the invention, for example, controller 204 may provide address and routing information to communicate packets through system 200 to the destination call terminal, such as call terminal 104. In this embodiment, controller 204 may also connect a call between packet telephony equipped call terminals as well.

Element 206 of system 200 may comprise, for example, a conference server or Multipoint Control Unit (MCU) for a VOP system. MCU 206 may implement conventional MCU, multipoint controller (MC) and multipoint processor (MP) functions in accordance with the H.323 Specification, and may also implement general conference control (GCC) and multipoint communication service (MCS) functions. MCU 206 may process a multipoint conference call, and may depacketize encapsulated packets of multiple streams of multimedia information to form a multimedia conferencing session. For example, MCU 206 may receive various streams of audio information and multiplex/demultiplex the streams together to enable call terminals 102, 104 and 108 to communicate audio information between each other for a conference call session.

Element 210 of element 206 may comprise, for example, a Delay Management Module (DMM). In one embodiment of the invention, DMM 210 may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In one embodiment of the invention, DMM 210 may operate to synchronize varying multimedia streams of information into a multimedia conferencinig session. Multimedia conferencing sessions may be sensitive to delay, particularly for voice communications. Some members of a multimedia conferencing session may be connecting to the session via different networks, such as the traditional PSTN, a packet network, a wireless network, and so forth. Each network may introduce varying amounts of delay into the conferencing session due to various factors, such as the type of voice coder/decoder (codec) used by a device in the network, or the amount of jitter experienced by a network. This delay may cause disruptions in the flow of the conference session. For example, one party to a conference session may receive voice information at a time different than another party to the same session. This may cause disruptions since the interactive perception of voice by humans are highly sensitive to delay.

Conventional solutions to the synchronization problem are unsatisfactory for a number of reasons. For example, one attempt to solve this problem is to reduce delay in a particular packet or wireless network by using Quality of Service (QoS) protocols and jitter buffers in the receivers. Despite these efforts, delay may still persist for a number of reasons. For example, a device communicating over a particular network may employ various forms of voice coding to reduce bandwidth consumption. Latencies may vary in accordance with a particular voice coding algorithm. The selection of a voice codec is typically session specific and dependent upon the particular environment in which the voice session is created. In another example, some networks may use one or more jitter buffers to compensate for jitter in a network. The function of a jitter buffer is to smooth out network jitter that a stream may experience by introducing additional delay to the stream, thus transforming network jitter into delay as far as a stream itself is concerned.

In one embodiment of the invention, DMM 210 may determine a delay parameter associated with a particular network. The delay parameter may be ascertained by looking at various characteristics of a network that might contribute to the overall delay of a stream of multimedia information communicated by the network. For example, a delay parameter for a packet network may be ascertained by determining jitter buffer delay and voice codec delay. With respect to the latter, this may include the frame and "look-ahead" delay of the voice codec. Both jitter buffer delay and voice codec delay are typically session specific and may be determined at the time a particular multimedia conferencing session is established. For example, jitter buffer delay is available from the jitter buffer algorithm at any particular time in operation. Codec delay may be determined from the type of codec used, which may be available at the time a call is set up. Consequently, DMM 210 may use the delay parameter to delay another stream of multimedia information that is part of the multimedia conferencing session. For example, the delay parameter may be used to delay a stream of PCM signals communicated by the PSTN, a stream of media data packets communicated by a packet network, or a stream of PCM signals or media data packets communicated by a wireless network.

In one embodiment of the invention, DMM 210 may generate a delay parameter for a packet network. For example, the delay parameter for a packet network may be represented by $D_S = D_J + D_C$, where $D_S$ is the length of the synchronization buffer in time, $D_J$ is the amount of jitter buffer delay, and $D_C$ is the algorithmic processing delay associated with the voice codec in use. It is worthy to note that $D_C$ may be voice session specific, and therefore can change from session to session depending upon various factors, e.g., the type of voice codec used. For example, G723.1 may have a processing delay of 37.5 ms, whereas G729 may have a processing delay of only 15 ms. These variables may alter the delay parameter for a given network.

Element 208 of element 206 may comprise, for example, a synchronization buffer for use in delaying a given stream of multimedia information. In one embodiment of the invention, synchronization buffer 208 may be used to introduce delay into a stream of PCM signals carried by the PSTN. In one embodiment, synchronization buffer 208 may be similar to a jitter buffer, which may store each data chunk in a temporal fashion. The play out time (i.e., the time data is sent to a mixer) may be adjusted depending on the amount of delay compensation required. For example, assume synchronization buffer 208 was designed to store up to six chunks of data, with the first chunk being the earliest in time and the sixth chunk being the latest in time. A particular data chunk may be sent to the mixer based on the amount of delay desired, e.g., sending data chunk 3 instead of data chunk 1 if a smaller amount of delay is warranted, and vice-versa.

The particular amount of delay may be determined using the delay parameter ascertained by DMM 210. Typically, there is less variation in delay for PCM signals communicated by the PSTN than a packet network. Therefore, one embodiment of the invention may use synchronization buffer 208 to delay a stream received from the PSTN to synchronize that stream with other streams participating in the multimedia conferencing session. It is worthy to note that although synchronization buffer 208 may be described as part of element 206, it can be appreciated that synchronization buffer 208 may be implemented in any part of system 200 and still fall within the scope of the invention.

With such a buffering mechanism, synchronization may be achieved between any two streams as long as the total amount of end-to-end delay is restricted to the acceptable range. In fact, it can even be used with streams from another packet network if they are out of synchronization without sacrificing voice quality or network performance. It can be appreciated that this technique may be applied not only to streams from IP network, but also to other networks such as a wireless network.

The operations of systems 100 and 200 may be further described with reference to FIG. 3 and accompanying examples. Although FIG. 3 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 3:
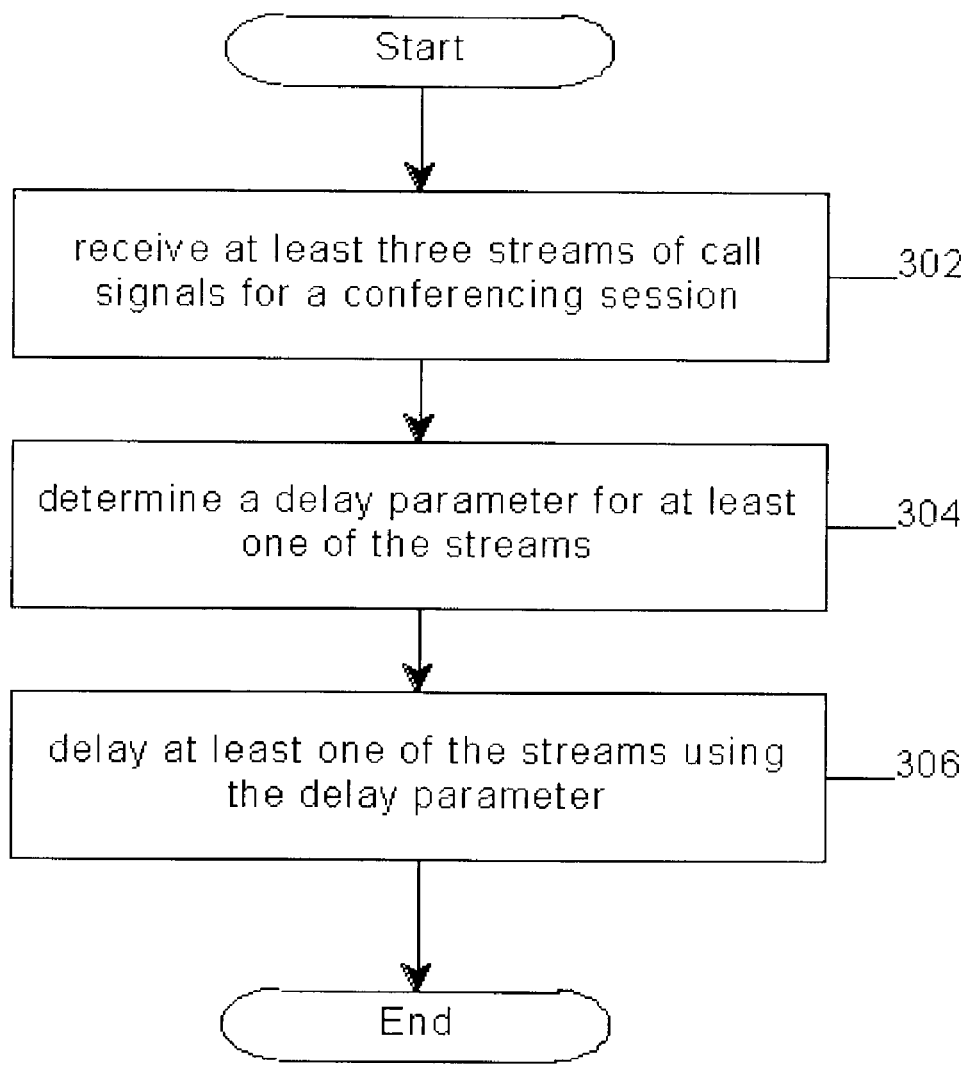
FIG. 3 is a block flow diagram of operations performed by a Delay Management Module (DMM) in accordance with one embodiment of the invention.

FIG. 3 is a block flow diagram of the operations performed by a DMM in accordance with one embodiment of the invention. In one embodiment of the invention, this and other modules may refer to the software and/or hardware used to implement the functionality for one or more embodiments as described herein. In this embodiment of the invention, this and other modules may be implemented as part of a processing system, such as MCU 206. It can be appreciated that this functionality, however, may be implemented by any device, or combination of devices, located anywhere in a communication network and still fall within the scope of the invention.

FIG. 3 illustrates a programming logic 300 for a DMM in accordance with one embodiment of the invention. In one embodiment of the invention, programming logic 300 illustrates programming logic to perform multimedia conferencing. At least three streams of multimedia information for a conferencing session may he received at block 302. A delay parameter may be determined for at least one of the streams at block 304. One of the streams may be delayed using the delay parameter at block 306.

In one embodiment of the invention, the multimedia information may comprise, for example, voice information. Further, one of the streams may comprise PCM signals communicated by the PSTN. In addition, another one of the streams may comprise media data packets communicated by a packet network or wireless network.

In one embodiment of the invention, a delay parameter may be determined by determining a first parameter representing a delay time associated with jitter. A second parameter representing a delay time associated with a voice coding algorithm may also be determined. The delay parameter may then be determined using the first and second parameters.

In one embodiment of the invention, delay may be introduced into a stream of multimedia information using a synchronization buffer. Moreover, the delay parameter may be updated on a periodic basis, and may be used to modify the delay time introduced by the synchronization buffer accordingly.

The operation of systems 100 and 200, and the processing logic shown in FIG. 3, may be better understood by way of example. Assume a first operator of call terminal 102 initiates a first call connection via the PSTN to a second operator of call terminal 104. Call terminal 102 may comprise a conventional telephone, while call terminal 104 may comprise a conventional packet telephony telephone. Gateway 202 completes the call connection to call terminal 104 using control information received from media gateway controller 204. Once the first call connection is created, the first operator may begin communicating voice information to the second operator. This communication may be referred to as a first stream of voice information. Gateway 202 may convert the PCM signals into media data packets for delivery to call terminal 104. Similarly, the second operator may begin communicating voice information to the first operator. This communication may be referred to as a second stream of voice information. Gateway 202 may convert the media data packets generated by call terminal 104 into PCM signals for delivery to call terminal 102.

Assume that the first and second operators desire to include a third operator using call terminal 108. The second operator may place the first operator on "hold" while they initiate a second call connection from call terminal 104 to call terminal 108. The second call connection may be, for example, routed from call terminal 104 to gateway 202, from gateway 202 to the PSTN, from the PSTN to a Mobile Subscriber Center (MSC), from the MSC to a Mobile Base Station (MBS), and finally from the MBS to call terminal 108. Once the second call connection is completed, the second and third operators may begin communicating voice information to each other. The communication of voice information from the third operator to the second operator may be considered a third stream of voice information.

To initiate the conference call session, the second operator may press a "conference" key on the keypad of call terminal 104. System 200 may receive control information to begin combining the first and second call connections into a conference call session. System 200 may then transfer both the first and second call connections to MCU 206 to perform the conferencing function. MCU 206 may receive the first, second and third streams of voice information, and multiplex/demultiplex the streams to perform the conference call session. As with any packet telephony conference call session, media data packets from the streams of voice information may be interleaved such that each of the operators may speak and listen as if they are in a natural conversation between all participants.

During setup of the conference call session, or sometime thereafter, DMM 210 may be used to synchronize the three streams of voice information. DMM 210 may determine a delay parameter for one of the three streams of voice information. For example, the second stream of voice information from call terminal 104 may have more delay than the first stream of voice information from call terminal 102. As a result, DMM 210 may determine a delay parameter for the second stream of voice information. The delay parameter may represent, for example, the delay generated by any network jitter buffers and voice codecs involved in the communication of the second stream of voice information. DMM 210 may communicate the delay parameter to gateway 202 for use with synchronization buffer 208. Synchronization buffer 208 may be used to delay voice information received from call terminal 102 by the amount of time indicated by the delay parameter. As a result, the length of delay between the first and second streams of voice information may be synchronized. This same process may be used to synchronize the second and third streams, if desired.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to perform multimedia conferencing, comprising:
   receiving at least three streams of different types of multimedia information for a conferencing session at a conferencing server;
   determining a delay parameter in said conferencing session by said conferencing server for at least one of said streams, wherein said delay parameter is associated with a first type of multimedia information; and
   delaying at least one other of said streams of a second type of multimedia information in said conferencing session by said conferencing server using said delay parameter, wherein said first type of multimedia information is different from said second type of multimedia information based on different coding techniques.

2. The method of claim 1, wherein one of said streams comprises Pulse Code Modulating (PCM) signals.

3. The method of claim 1, wherein one of said streams comprises media data packets.

4. The method of claim 1, wherein said multimedia information comprises voice information.

5. The method of claim 1, wherein said delay parameter represents a length of time to delay a stream of multimedia information.

6. The method of claim 1, wherein said determining comprises:
   determining a first parameter representing a delay time associated with jitter;
   determining a second parameter representing a delay time associated with a voice coding algorithm; and
   determining said delay parameter using said first and second parameters.

7. The method of claim 1, wherein said delay parameter is updated on a periodic basis.

8. A system to perform multimedia conferencing, comprising:
   a set of call terminals to communicate streams of different types of multimedia information;
   a conferencing server to combine said streams for a conference session;
   a delay management module to determine a delay parameter for one of said streams in said conference session, wherein said delay parameter is associated with a first type of multimedia information; and
   a synchronization buffer to receive said delay parameter and delay one other of said streams of a second type of multimedia information in said conference session in accordance with said delay parameter, wherein said first type of multimedia information is different from said second type of multimedia information based on different coding techniques.

9. The system of claim 8, wherein said call terminals comprise at least one of a telephone, a packet telephony telephone and a wireless transceiver.

10. The system of claim 8, wherein said conferencing server further comprises a PSTN interface to convert PSTN signals to packet signals.

11. The system of claim 8, further comprising a jitter buffer associated with one of said streams, and wherein one of said call terminals include a voice codec, with said delay management module determining said delay parameter by determining a delay associated with said voice codec and a delay associated with said jitter buffer.

12. An article comprising:

a storage medium;

said storage medium including stored instructions that, when executed by a processor, result in performing multimedia conferencing by receiving at least three streams of different types of multimedia information for a conferencing session at a conferencing server, determining a delay parameter for at least one of said streams, wherein said delay parameter in said conferencing session by said conferencing server is associated with a first type of multimedia information, and delaying at least one other of said streams of a second type of multimedia information in said conferencing session by said conferencing server using said delay parameter, wherein said first type of multimedia information is different from said second type of multimedia information based on different coding techniques.

13. The article of claim 12, wherein the stored instructions, when executed by a processor, further result in said determining by determining a first parameter representing a delay time associated with jitter, determining a second parameter representing a delay time associated with a voice coding algorithm, and determining said delay parameter using said first and second parameters.

14. The article of claim 12, wherein the stored instructions, when executed by a processor, further result in updating said delay parameter on a periodic basis.

15. A system, comprising:

a computing platform adapted to perform multimedia conferencing;

said platform being further adapted to receiving at least three streams of different types of multimedia information for a conferencing session, determining a delay parameter for at least one of said streams in said conferencing session, wherein said delay parameter is associated with a first type of multimedia information, and delaying at least one other of said streams of a second type of multimedia information in said conferencing session using said delay parameter, wherein said first type of multimedia information is different from said second type of multimedia information based on different coding techniques.

16. The system of claim 15, wherein said platform is further adapted to determining said delay parameter by determining a first parameter representing a delay time associated with jitter, determining a second parameter representing a delay time associated with a voice coding algorithm, and determining said delay parameter using said first and second parameters.

17. The system of claim 15, wherein said platform is further adapted to updating said delay parameter on a periodic basis.

* * * * *